United States Patent Office 3,269,862
Patented August 30, 1966

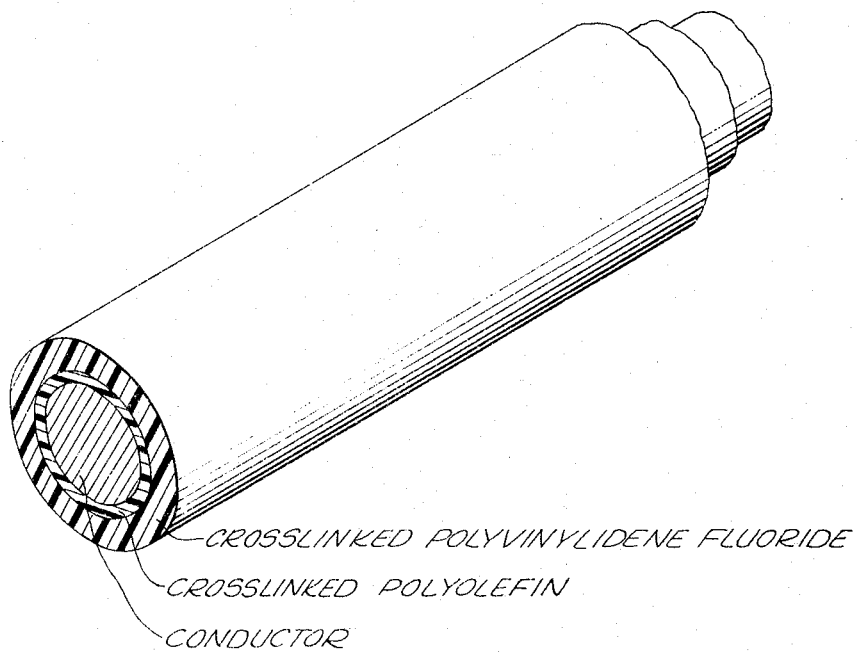

3,269,862
CROSSLINKED POLYVINYLIDENE FLUORIDE OVER A CROSSLINKED POLYOLEFIN
Vincent L. Lanza and Edward C. Stivers, Atherton, Calif., assignors to Raychem Corporation, Redwood City, Calif., a corporation of California
Filed Oct. 22, 1964, Ser. No. 405,848
9 Claims. (Cl. 117—218)

The present invention is directed to an electrical insulating material which possesses unexpectedly high resistance to heat aging and/or flame as well as possessing highly satisfactory strength characteristics over a broad temperature range. More particularly, the present invention is directed to a composite electrical insulating material comprising a first inner layer of a polyolefin and a second outer layer of polyvinylidene fluoride in which the polymer comprising each of these layers is crosslinked.

It has long been recognized that polyolefins such as polyethylene are excellent insulating materials for electric wires, electric components and the like. However, the excellent dielectric properties of polyolefins have been offset by their relatively low melting point and their low resistance to flame and oxidation. Thus, considerable effort has been directed to developing polyolefin formulations which are not subject to these deficiencies. It was found that the relatively low melting point of polyethylene may be improved by crosslinking, e.g., by irradiation or chemical means. It was further found that certain additives will flame retard polyethylene to some extent. However, many flame retarding additives adversely affect the dielectric properties of polyolefins as well as the low temperature, corrosion resistance, etc., properties thereof.

Furthermore, the heat and flame resistance requirements of polyolefin insulation as well as the strength requirements thereof have constantly been increased as the necessity to expose insulating materials to increasingly severe conditions has developed. Thus, there has been a constant need for significantly improved polyolefin insulating materials. The present invention satisfies this need to an extent unprecedented by previous formulations.

Thus, it is a primary object of the present invention to provide an electrical insulating material which contains a polyolefin and which possesses a high degree of flame resistance.

It is another object of the present invention to provide an electrical insulating material which contains a polyolefin and which possesses a high resistance to heat aging.

It is a further object of the present invention to provide a composite electrical insulating material comprising a crosslinked polyolefin layer and a crosslinked polyvinylidene fluoride layer which possesses a high degree of flame resistance and a high degree of resistance to heat aging and high strength characteristics over a broad temperature range.

It is still another object of the present invention to provide insulated electric wire and electric components which are insulated with the insulating material of the present invention.

Other objects and advantages of the present invention, it is believed, will be apparent from the following detailed description of specific embodiments thereof.

Broadly, the insulating material of the present invention comprises a composite material having an inner layer comprising a polyolefin and an outer layer comprising polyvinylidene fluoride. This insulating material may be applied to an electric wire by means of a conventional compound extrusion process wherein the inner polyolefin layer is first extruded over the wire and the outer polyvinylidene fluoride layer is then extruded over the polyolefin layer. Both layers are crosslinked. The polyolefin layer may be crosslinked by irradiation with high energy electrons, atomic pile radiation or the crosslinking may be initiated by ultraviolet irradiation. Alternatively, the polyolefin may be crosslinked chemically, e.g., by means of a peroxide when polyethylene is used. The polyvinylidene fluoride is preferably crosslinked by means of the techniques disclosed in copending Lanza applications, Serial Numbers 257,763, filed February 11, 1963, and 403,328, filed October 12, 1964, the disclosures of which applications are incorporated herein by reference. As disclosed in these Lanza applications, a minor amount of triallyl cyanurate is incorporated in the polymer before irradiation. Each layer may be irradiated separately or preferably both layers are irradiated simultaneously.

It has also been found desirable to add an antimony compound such as antimony oxide to the polyolefin to increase flame resistance. When antimony oxide is used, it should be present in an amount of at least 5% by weight, based on the weight of the polyolefin.

The insulating material of the present invention possesses a combination of characterstics not found in conventional insulating materials. Particularly surprising is the high degree of flame resistance possessed by the insulating material of the present invention even though no conventional flame retardant systems are added to the highly flammable polyolefin. Although it is to be understood that the present invention is not to be considered to be confined to any particular theory of operation, it would appear possible that the polyvinylidene fluoride outer layer functions to substantially reduce the availability of oxygen to the polyolefin thereby inhibiting flame propagation. The polyvinylidene fluoride itself does not support combustion and when pyrolyzed appears to be converted to a highly stable polynuclear structure. The excellent resistance to heat aging of the insulating material of the present invention may also be attributed to the function of the polyvinylidene fluoride outer layer of markedly decreasing the availability of oxygen to the polyolefin.

Still another advantage of the present invention is that the polyvinylidene fluoride outer jacket imparts such a high degree of strength that the thickness of insulation may be substantially reduced. This strength in a thin-wall structure complements the light weight and excellent dielectric properties of the polyolefin to produce a unique combination of desirable properties. The fact that thin-wall structures are made possible by the present invention is of great importance in view of the emphasis on miniaturization of electronic circuitry in modern technology. The same properties make the insulation of the present invention most valuable in applications where light weight is of importance such as aircraft, missiles, satellites, etc.

In the drawing, the sole figure illustrates a conductor having an insulating material comprising a first layer of crosslinked polyolefin and a second layer of crosslinked polyvinylidene fluoride.

The present invention is further illustrated by the following examples wherein all proportions are expressed in parts by weight unless otherwise indicated.

EXAMPLE I

A 22 gauge stranded (19/34) tin coated copper conductor having an outside diameter of 0.032 inch was coated with a composition consisting of 81.6 parts high density, high molecular weight polyethylene composition (comprising Tenite 3310R), 1.1 parts Santonox R, 12.9 parts antimony oxide and 2 parts triallyl cyanurate to a thickness of 0.0145 inch thereby giving the insulated wire an outside diameter of 0.061 inch. This insulated wire was then subjected to an irradiation dose of 20 megarads using high energy electrons as the irradiation source. This wire was then coated with a composition consisting of 95.2 parts polyvinylidene fluoride and 2.4 parts triallyl cyanurate. The polyvinylidene fluoride coating imparted a final outside diameter of 0.071 inch to the wire. This wire was then subjected to an irradiated dose of 6 megarads using high energy electrons as the irradiation source.

This wire was then subjected to some standard tests and the results were compared with those obtained for various high temperature insulated wires approved for use by the military, the insulation of which comprised various laminated constructions which are vastly superior to all known polyolefin insulating materials. In the order set forth in Table 1, these insulating materials comprised silicone rubber with an outer Dacron-glass braid; polytetrafluoroethylene having an interior layer of mineral powder and polytetrafluoroethylene tape in combination with saturated glass braid.

composition to that described in Example I to a thickness of 0.0045 inch to give an outside diameter of 0.049 inch. This insulation was irradiated by high energy electrons to a dose of 20 megarads. This insulated wire was then provided with a second coating consisting of 97% polyvinylidene fluoride and 3% triallyl cyanurate to a thickness of 0.003 inch to give a final outside diameter of 0.055 inch. This laminated insulation was then irradiated with high energy electrons to a dose of 5 megarads.

The insulating material of this example was then compared with standard thin wall single extrusion insulated wires which are substantially superior to all known polyolefin insulated wires in the same manner as that described in Example I and the results of these tests are set forth in Table 2. 400 grit paper with 0.5 pound load and 1.0 pound tension was used for the abrasion test rather than the 4/0 grit garnet paper of Example I.

*Table 1*

| Sample (Wire Type) | AWG Size | O.D. (Aver. Inches) | Weight (Aver. lbs./ 1,000 ft.) | Abrasion (Aver. Inches) | Cut-through Dynamic (lbs.) | Vertical Flammability Test |
|---|---|---|---|---|---|---|
| MIL-W-8777 (MS 25471) | 22 | .077 | 5.18 | 24.6 | 120 | Fail. |
| MIL-W-22759 (MS 18000) | 22 | .073 | 5.61 | 20.6 | 23.4 | Pass. |
| MIL-W-22759 (MS 90294) | 22 | .072 | 5.42 | 18.5 | 41.3 | Do. |
| Example 1 | 22 | .071 | 4.20 | 24.6 | 55.3 | Do. |

*Table 2*

| Sample (Wire Type) | AWG Size | O.D. (Aver. Inches) | Weight (Aver. lbs./ 1,000 ft.) | Abrasion (Aver. Inches) | Cut-through Dynamic (lbs.) | Vertical Flammability Test |
|---|---|---|---|---|---|---|
| MIL-W-16878 (Type E-TFE) | 20 | .059 | 5.1 | 25.4 | 9.3 | Pass. |
| MIL-W-16878 (Type B-PVC) | 20 | .059 | 4.6 | 21.4 | 9.5 | Do. |
| MIL-W-16878 (Type K-FEP) | 20 | .060 | 5.2 | 12.3 | 6.7 | Do. |
| Example II | 20 | .055 | 4.45 | 28.5 | 32.9 | Do. |

The abrasion test was conducted in accordance with MIL-T-5438 using a Janco Abrasion Tester using 4/0 grit garnet paper, a one pound load and one pound tension. The results are expressed in the number of inches of abrasive tape which were required to abrade through the insulation and make contact with the conductor. The dynamic cut through test was conducted by forcing a knife with a 90° edge, 0.005 inch radius, positioned perpendicular to the axis of the wire through the insulation at a rate of 0.2 inch per minute. A potential of 12 volts was maintained between the knife edge and the conductor of the specimen. When the knife edge cut through to the conductor, completion of the 12 volt circuit tripped a relay and recorded the force required to cut through the insulation. The vertical flammability test was conducted according to Federal specification J-C-98, Method 5221.

Examination of Table 1 clearly shows that the insulation of the present invention had by far the lightest weight, high abrasion and cut through resistance and is capable of passing the flammability test. In contrast, none of the other insulating materials possess this unique combination of properties. The wire designated MS-25471 was substantially larger and possessed good strength characteristics, but burns when subjected to the vertical flammability test. The remaining insulating materials were inferior to the insulation of the present invention with regard to both strength properties measured.

The comparison made in this example was between relatively thick-walled, abrasion resistant insulating materials which are particularly useful for insulating airframe wire.

EXAMPLE II

A 20 gauge stranded (19/32) tin coated copper conductor having an outside diameter of 0.040 inch was provided with a first coating of polyethylene insulation identical in Once again, it was observed that although the insulated material of the present invention was substantially lighter than that of the remaining insulating materials, it was far superior to these wires.

EXAMPLE III

In order to determine the effect of the presence of antimony oxide, the composition of the inner layer of an insulating material comprising an outer layer of crosslinked polyvinylidene fluoride and an inner layer of crosslinked polyethylene was varied. Four formulations were prepared, each containing polyethylene (HiFax 1400E), 1.25 parts Santonox R and 2.0 parts triallyl isocyanurate. In addition, formulation 1 contained 91 parts polyethylene and 0 part antimony oxide; formulation 2 contained 93 parts polyethylene and 5 parts antimony oxide; formulation 3 contained 88 parts polyethylene and 10 parts antimony oxide; and, formulation 4 contained 78 parts polyetheylene and 20 parts antimony oxide.

Each of these formulations was applied to a conductor in the same manner and size as that set forth in Example II. The polyolefin inner layers were irradiated with high energy electrons to a dose of 10 megarads and a dose of 20 megarads. The outer polyvinylidene fluoride layer was the same for each formulation, had the same composition as that described in Example I and was irradiated to a dose of 5 megarads with high energy electrons. Each sample was subjected to a heat aging flexibility test measured in hours at 200° C. until breaking occurred on bending over its own diameter and to vertical flammability test of ASTM D 734. The results of the tests are set forth in Table 3.

Table 3

| Formulation | Polyethylene Dose 10 megarads | | Polyethylene Dose 20 megarads | |
|---|---|---|---|---|
| | Heat aging (hours) | Vertical flammability (inches) | Heat aging (hours) | Vertical flammability (inches) |
| 1 | 113 | | 113 | 7.0 |
| 2 | 121 | | | 6.2 |
| 3 | 121 | | 145 | 4.6 |
| 4 | | | 121 | 4.5 |

EXAMPLE IV

To establish the necessity of crosslinking both layers of the insulation of the present invention, a series of identical samples was prepared each comprising the same inner polyethylene layer and the same outer polyvinylidene flouride layer having the same composition and thickness described in Example I. It was found that when the polyetheylene layer was not irradiated, the insulation failed the accelerated aging test of MIL-W-81044/2(WEP), regardless of whether the polyvinylidene fluoride layer was irradiated or unirradiated. When these insulated specimens were subjected to the vertical flammability test prescribed by Federal Specification J-C-98, Method 5221, it was found that the specimen in which both layers were irradiated burned for 3.6 inches while the specimen in which the polyethylene layer was irradiated but the polyvinylidene fluoride layer was not irradiated burned 6.5 inches, almost twice as much. A second series of insulated wires having insulation having the same composition and thickness as described in Example II was subjected to the same accelerated aging test and it was found that only when both layers were irradiated would the insulating material pass this test.

The precise composition of the insulating material of the present invention will, of course, depend upon the properties which it is desired to obtain. In general, the inner polyethylene layer should be crosslinked to an extent equivalent to irradiation with high energy electrons to a dose of at least about 2 megarads and the polyvinylidene fluoride outer layer should be crosslinked to an extent equivalent to irradiation of polyvinylidene fluoride containing 0.5% by weight triallyl cyanurate with high energy electrons to a dose of at least about 1 megarad. One measure of the amount of crosslinking necessary is that it be sufficient to impart form stability to the polymeric composition when it is heated above its crystalline melting temperature. By form stability it is meant that when either layer is heated to above its crystalline melting temperature it will not melt and flow and will retain substantially its room temperature shape. For most uses, the minimum thickness of the inner polyetheylene layer will be about 3 mils and that of the outer polyvinylidene fluoride layer will be about 1.5 mils. Conventional additives may, in general, be added to each of the layers to obtain specific characteristics in the insulating material and it is to be understood that the present invention includes such materials. Furthermore, although the foregoing examples are directed to polyethylene as the inner layer, it is to be understood that other polyolefins, such as polypropylene and copolymers of ethylene with other monomers such as butene-1, vinyl acetate, etc., may be used.

Having fully described the present invention, it is to be understood that it is not to be limited to the specific details set forth, but is of the full scope of the appended claims.

We claim:

1. An insulating material comprising a first layer comprising a crosslinked polyolefin and a second layer comprising crosslinked polyvinylidene fluoride, each of said layers being crosslinked throughout.

2. An insulating material comprising an irradiated, crosslinked polyolefin and a second layer comprising irradiated crosslinked polyvinylidene fluoride, each of said layers being crosslinked throughout, said second layer containing triallyl cyanurate in an amount of at least 0.5% by weight.

3. The insulating material of claim 1 wherein said first layer contains an antimony compound in an amount equivalent to at least 5% by weight of antimony oxide.

4. An article comprising an electrical conductor and an insulating material surrounding at least a portion of said conductor, said insulating material comprising an inner layer comprising a crosslinked polyolefin and an outer layer comprising crosslinked polyvinylidene fluoride, each of said layers being crosslinked throughout.

5. The article of claim 4 wherein said conductor is a wire.

6. An insulating material comprising a first layer comprising a polyolefin, said polyolefin being crosslinked to an extent equivalent to irradiation with high energy electrons to a dose of 2 megarads, and a second layer comprising a crosslinked polyvinylidene fluoride, each of said layers being crosslinked throughout, said polyvinylidene fluoride being crosslinked to an extent equivalent to irradiation of polyvinylidene fluoride containing 0.5% by weight triallyl cyanurate with high energy electrons to a dose of at least about 1 megarad.

7. The insulating material of claim 6 wherein said polyolefin is polyethylene.

8. An insulating material comprising a first layer comprising a polyolefin and a second layer comprising polyvinylidene fluoride, each of said layers being crosslinked throughout, each of said layers being crosslinked at least to an extent such that when heated above its respective crystalline melting temperature it has form stability.

9. The insulating material of claim 8 wherein said polyolefin is polyethylene.

References Cited by the Examiner

UNITED STATES PATENTS

| | | | |
|---|---|---|---|
| 2,774,704 | 12/1956 | Smith | 161—189 |
| 2,897,100 | 7/1959 | Grenley et al. | 117—138.8 |
| 3,006,787 | 10/1961 | Blewis et al. | 117—136 |
| 3,108,086 | 10/1963 | Russell et al. | 117—47 |
| 3,122,445 | 2/1964 | Osborn | 117—47 |
| 3,142,629 | 7/1964 | Timmerman | 117—93.31 |

FOREIGN PATENTS 903,566  8/1962  Great Britain.

JOSEPH REBOLD, *Primary Examiner.*

RICHARD D. NEVIUS, *Examiner.*

W. L. JARVIS, *Assistant Examiner.*